(12) United States Patent
Crawford et al.

(10) Patent No.: US 10,983,702 B2
(45) Date of Patent: Apr. 20, 2021

(54) REDUCING DATA STORAGE SYSTEM I/O BANDWIDTH VIA READ-ONCE POINT IN TIME COPY

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Austin, TX (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 16/177,201

(22) Filed: Oct. 31, 2018

(65) Prior Publication Data

US 2019/0065076 A1    Feb. 28, 2019

Related U.S. Application Data

(63) Continuation of application No. 15/425,745, filed on Feb. 6, 2017, now Pat. No. 10,157,001, which is a
(Continued)

(51) Int. Cl.
*G06F 3/06*      (2006.01)
*G11B 5/008*   (2006.01)

(52) U.S. Cl.
CPC ............ *G06F 3/0613* (2013.01); *G06F 3/061* (2013.01); *G06F 3/0629* (2013.01);
(Continued)

(58) Field of Classification Search
CPC ...... G06F 3/0613; G06F 3/061; G06F 3/0629; G06F 3/0649; G06F 3/0653;
(Continued)

(56) References Cited

U.S. PATENT DOCUMENTS 6,338,114 B1    1/2002   Paulsen et al.
6,564,307 B1    5/2003   Micka et al.
(Continued)

OTHER PUBLICATIONS

List of IBM Patents or Patent Applications Treated as Related.
(Continued)

*Primary Examiner* — Tracy A Warren
(74) *Attorney, Agent, or Firm* — Zilka-Kotab, P.C.

(57) ABSTRACT

According to one embodiment, a computer program product for read-once point-in-time copy includes a computer readable storage medium having program instructions embodied therewith. The computer readable storage medium is not a transitory signal per se, and the program instructions are executable by a storage system manager to cause the storage system manager to perform a method comprising: detecting a read access to one or more data tracks of a target data storage module; setting a value of one or more bits in response to detecting the read access to the one or more data tracks, each of the one or more bits being associated with one of the one or more data tracks. The value of the one or more bits is set to a value configured to prevent a copy-on-write operation being applied to the one or more data tracks to which the read access was detected.

20 Claims, 7 Drawing Sheets

Related U.S. Application Data continuation of application No. 14/923,378, filed on Oct. 26, 2015, now Pat. No. 9,601,151.

(52) U.S. Cl.
CPC .......... *G06F 3/0649* (2013.01); *G06F 3/0653* (2013.01); *G06F 3/0673* (2013.01); *G06F 3/0685* (2013.01); *G11B 5/00813* (2013.01)

(58) Field of Classification Search
CPC .. G06F 3/0673; G06F 3/0685; G06F 11/1446; G06F 2212/84
See application file for complete search history.

(56) References Cited

U.S. PATENT DOCUMENTS

| | | | |
|---|---|---|---|
| 6,782,452 B2 | 8/2004 | Williams, III | |
| 6,910,214 B1 | 6/2005 | Reed et al. | |
| 8,433,864 B1* | 4/2013 | Narayanan | G06F 11/1448 |
| | | | 707/645 |
| 9,601,151 B1 | 3/2017 | Crawford et al. | |
| 10,157,001 B2 | 12/2018 | Crawford et al. | |
| 2003/0110356 A1 | 6/2003 | Williams | |
| 2005/0240928 A1 | 10/2005 | Brown et al. | |
| 2005/0246382 A1* | 11/2005 | Edwards | G06F 16/13 |
| 2006/0218370 A1* | 9/2006 | Satoyama | G06F 3/0608 |
| | | | 711/170 |
| 2011/0191555 A1* | 8/2011 | Narayanan | G06F 12/00 |
| | | | 711/162 |
| 2017/0147236 A1 | 5/2017 | Crawford et al. | |

OTHER PUBLICATIONS

Flynn et al., "Using IBM TotalStorage Enterprise Storage Server Flash Copy Function with the VMware ESX 2.5 Server," IBM and VMware, Sep. 1, 2005, pp. 1-25.
IBM, "Quick/Read Only Flash Copy," IP.Com, Aug. 20, 2004, pp. 1-4.
Crawford et al., U.S. Appl. No. 14/923,378, filed Oct. 26, 2015.
Non-Final Office Action from U.S. Appl. No. 14/923,378, dated Jul. 28, 2016.
Notice of Allowance from U.S. Appl. No. 14/923,378, dated Nov. 14, 2016.
Crawford et al., U.S. Appl. No. 15/425,745, filed Feb. 6, 2017.
Non-Final Office Action from U.S. Appl. No. 15/425,745, dated Mar. 28, 2018.
Notice of Allowance from U.S. Appl. No. 15/425,745, dated Aug. 13, 2018.

\* cited by examiner

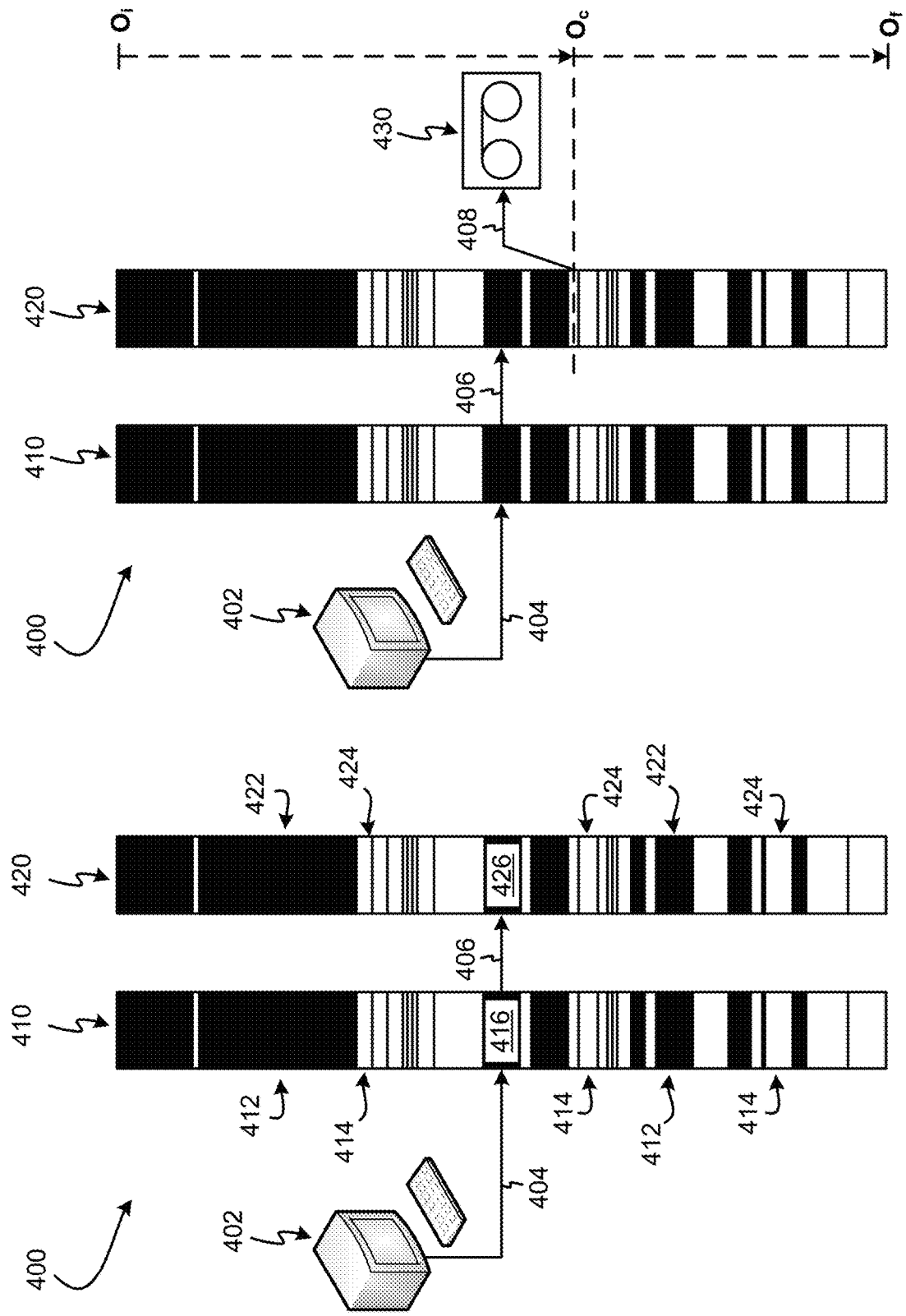

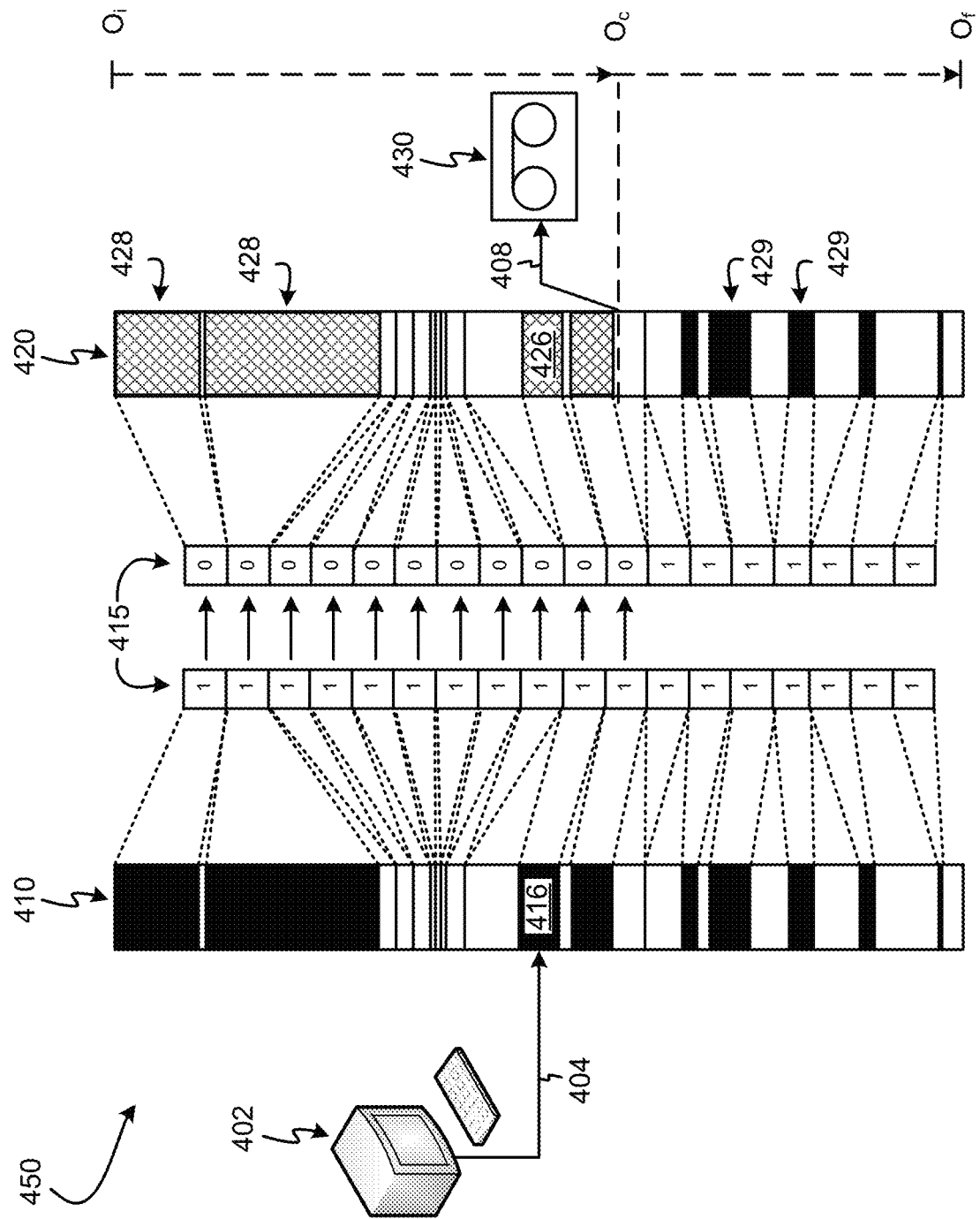

REDUCING DATA STORAGE SYSTEM I/O BANDWIDTH VIA READ-ONCE POINT IN TIME COPY

BACKGROUND

The present invention relates to managing data storage systems, and more specifically, this invention relates to reducing input/output (I/O) bandwidth in data storage systems by preventing unnecessary copy operations.

In conventional data storage systems, particularly data storage systems including plural storage modules, devices, etc. and where data are routinely copied from one module, device etc. to another, rigorous copying of changes on the one module, device, etc. over to the other is generally advantageous for maintaining consistency between the data on each module, device, etc.

However, in situations where the data need not be copied over, e.g. because data consistency on one of the two modules is not critical, this conventional rigorous copy regime increases load on the storage system's I/O bandwidth without commensurate benefit to the data storage system as a whole. In addition, this increased load results in the undesirable wasting of energy resources, which is both economically and environmentally detrimental.

Accordingly, it would be advantageous to provide systems and techniques enabling a reduction in I/O bandwidth load by avoiding unnecessary copy operations in data storage systems.

SUMMARY

In one embodiment, a computer program product for read-once point-in-time copy includes a computer readable storage medium having program instructions embodied therewith. The computer readable storage medium is not a transitory signal per se, and the program instructions are executable by a storage system manager to cause the storage system manager to perform a method comprising: detecting a read access to one or more data tracks of a target data storage module; setting a value of one or more bits in response to detecting the read access to the one or more data tracks, each of the one or more bits being associated with one of the one or more data tracks. The value of the one or more bits is set to a value configured to prevent a copy-on-write operation being applied to the one or more data tracks to which the read access was detected.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4A is a schematic view of a conventional storage system architecture.

FIG. 4B is a schematic view of a conventional storage system architecture performing an unnecessary copy operation.

FIG. 4C is a schematic view of an inventive storage system architecture, according to one embodiment.

DETAILED DESCRIPTION

Figure 1:
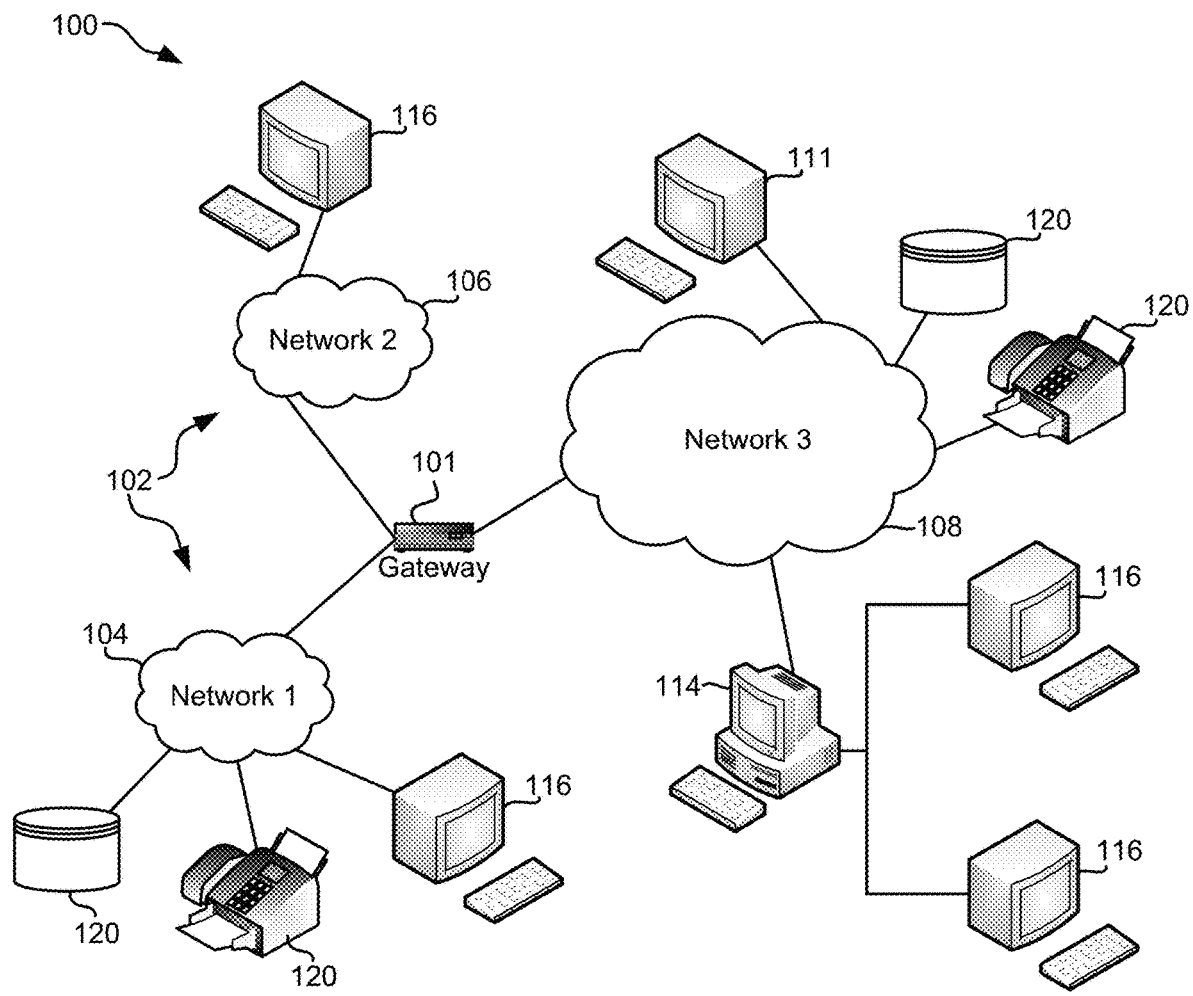
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for managing data storage systems, and more specifically, for reducing input/output bandwidth in data storage systems by preventing unnecessary copy operations.

In one general embodiment, a computer-implemented method includes: detecting a read access to one or more data tracks of a target data storage module; and setting a value of one or more bits in response to detecting the read access to the one or more data tracks, each of the one or more bits being associated with one of the one or more data tracks. The value of the one or more bits is set to a value configured to prevent a copy-on-write operation being applied to the one or more data tracks to which the read access was detected.

In another general embodiment, a computer program product for read-once point-in-time copy includes a computer readable storage medium having program instructions embodied therewith. The computer readable storage medium is not a transitory signal per se, and the program instructions are executable by a storage system manager to cause the storage system manager to perform a method. The method includes detecting a read access to one or more data tracks of a target data storage module; and setting a value of one or more bits in response to detecting the read access to the one or more data tracks, each of the one or more bits being associated with one of the one or more data tracks. The value of the one or more bits is set to a value configured to prevent a copy-on-write operation being applied to the one or more data tracks to which the read access was detected.

In yet another general embodiment, a system includes a processor and logic integrated with and/or executable by the processor. The logic is configured to: detect a read access to one or more data tracks of a target data storage module; and set a value of one or more bits in response to detecting the read access to the one or more data tracks, each of the one or more bits being associated with one of the one or more data tracks. The value of the one or more bits is set to a value configured to prevent a copy-on-write operation being applied to the one or more data tracks to which the read access was detected.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
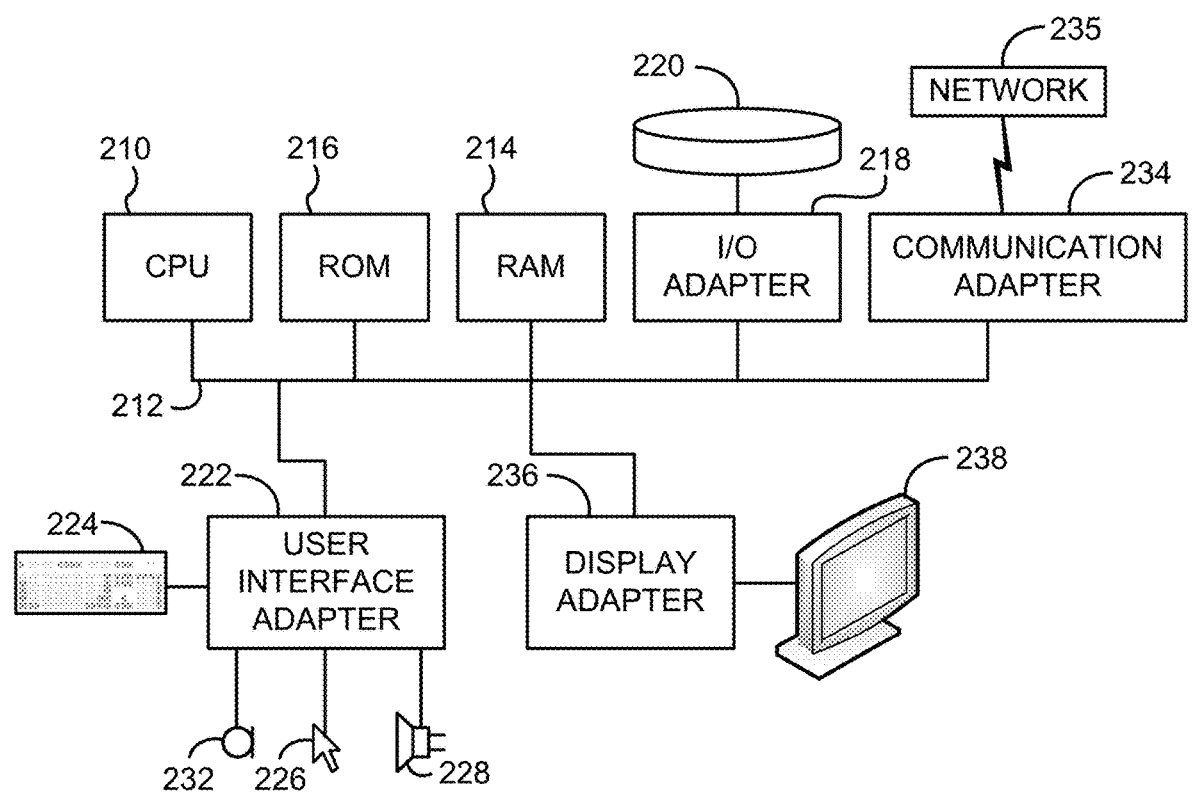
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
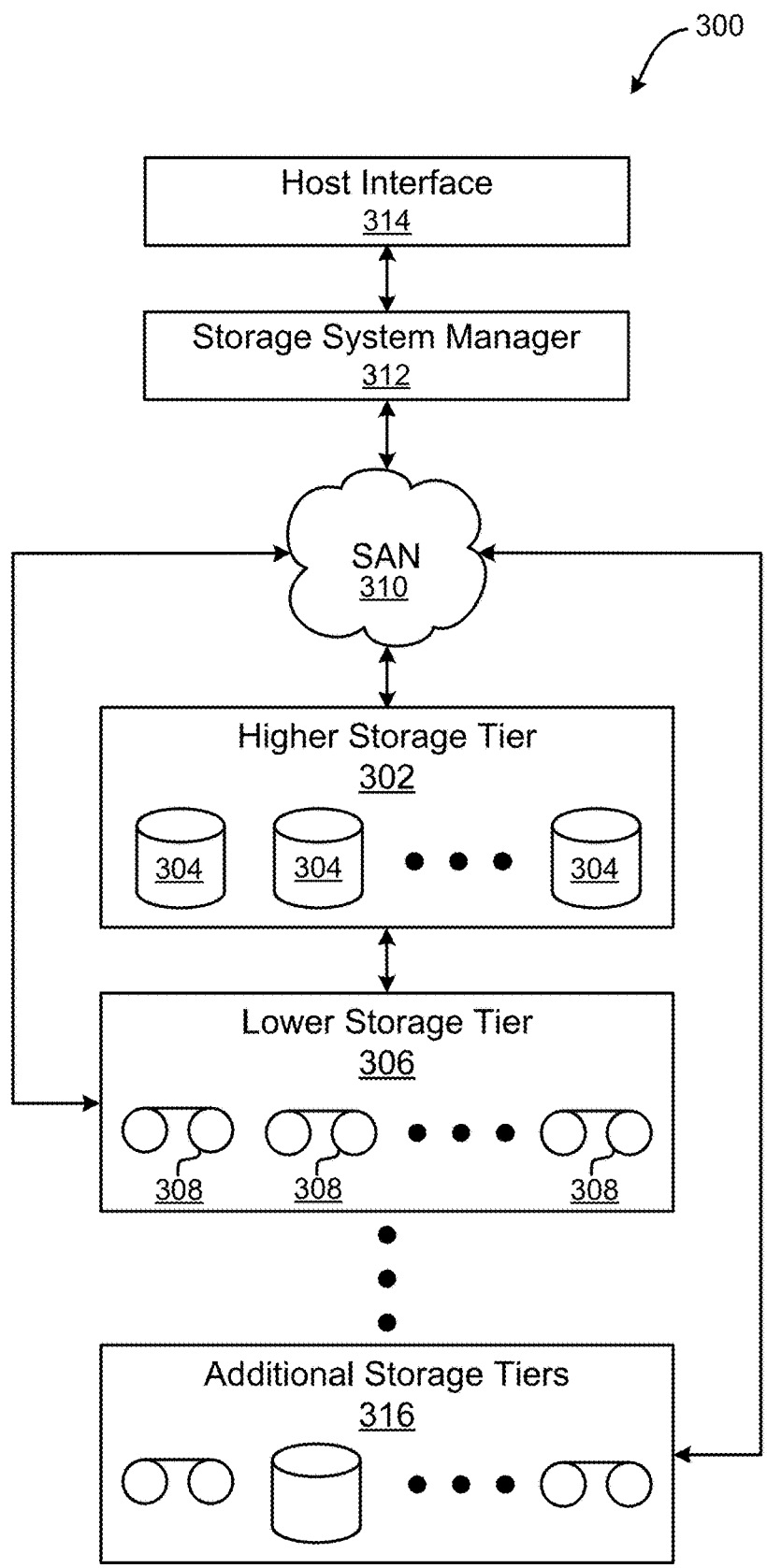
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media, modules, etc. on at least one higher storage tier 302 and at least one lower storage tier 306.

The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media, modules, devices, etc. as desired by a designer of the system 300. Also, any of the higher storage tiers 302 and/or the lower storage tiers 306 may include some combination of storage devices and/or storage media, which may be implemented as physical devices, virtual storage modules, etc. as would be understood by a person having ordinary skill in the art upon reading the present descriptions.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Referring now to FIG. 4A, a conventional storage system 400 is shown. As shown, the conventional storage system 400 includes a host 402 coupled to a source 410, which is in turn coupled to a target 420. The source 410 and target 420 each comprise a plurality of data tracks, some of which have data written thereto (i.e. tracks 412, 422) and others which are empty (i.e. tracks 414, 424).

In practice, the conventional storage system 400 implements copy-on-write functions (also referred to as copy source-to-target functions, point in time copy functions, etc. as would be understood by a skilled artisan upon reading the present descriptions) in response to the source 410 receiving a write request, instruction, command, etc. 404 for data to be written to one or more track(s) 416 of the source 410. Using copy-on-write functionality, the request and/or any necessary data are propagated 406 to the target 420 in corresponding target track(s) 426.

With continuing reference to a conventional storage system 400 as shown in FIG. 4B, this copy-on-write functionality is performed without regard to whether data tracks 422 of the target 420 have been offloaded 408 to long term storage 430, e.g. tape-based storage media 430. Rather, the conventional storage system 400 is ignorant of any previous or concurrent offload process 408. As a result, during and after an offload process 408, the conventional storage system 400 propagates 406 to a corresponding data track(s) of the target 420 those changes made to data tracks 416 of the source 410 that occur in response to source 410 receiving a write command, request, instruction, etc. 404 from the host 402.

While this conventional procedure of ignoring long term offload processes 408 advantageously maintains consistency between data tracks 416 of the source 410 and data track(s) 426 of the target 420, it also results in increased I/O bandwidth, which may require data or applications relying on data be suspended or otherwise interfered with during the copy-on-write process. In the modern era where energy efficiency is a prime consideration in the operation of data storage systems, any unnecessary increase in I/O bandwidth undesirably wastes energy resources.

Accordingly, the presently disclosed inventive concepts are configured, in various embodiments, to reduce I/O bandwidth and system hold-up associated with the problem presented by conventional storage systems' ignorance of offload processes.

Figure 4D:
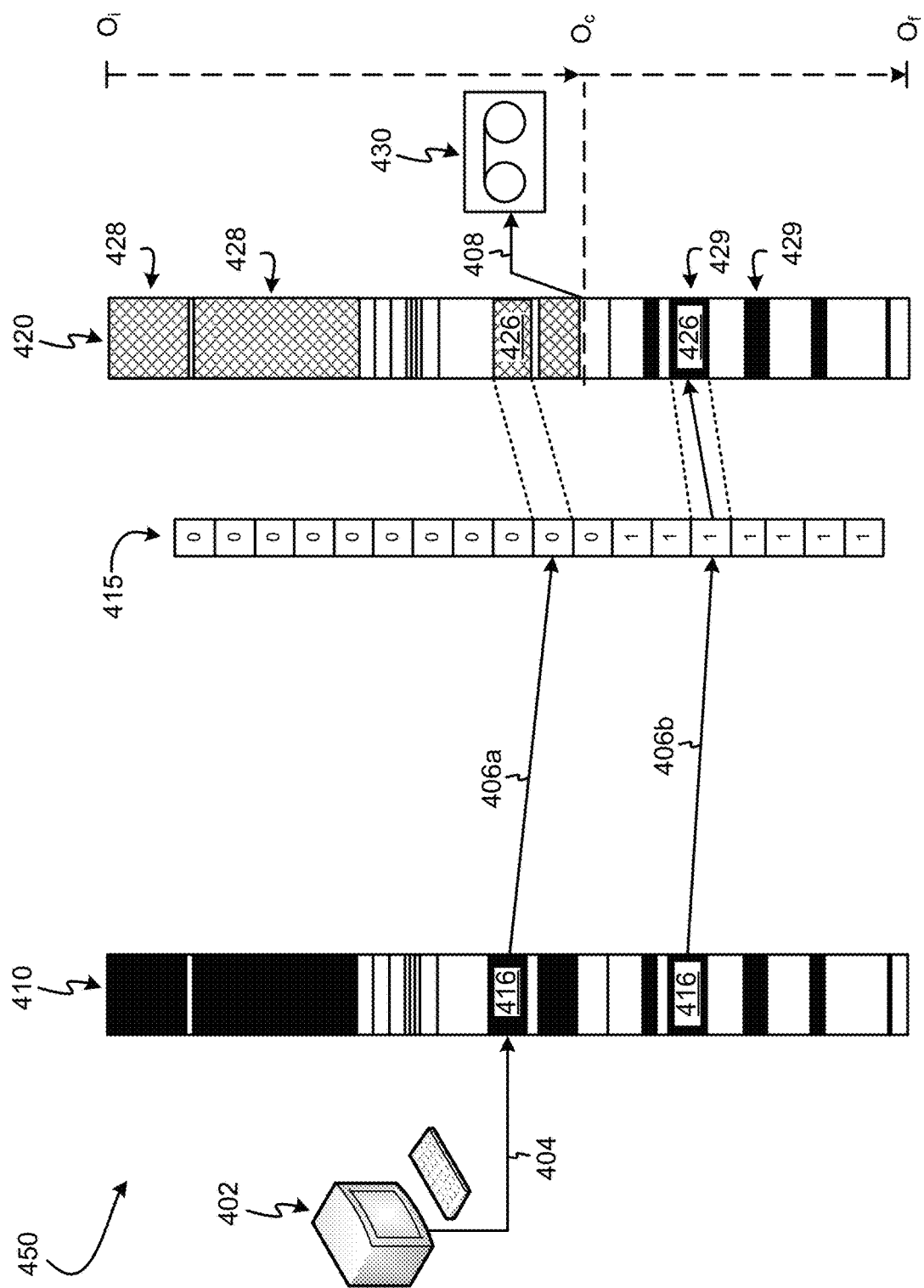
FIG. 4D is a schematic view of a conventional storage system architecture, according to one embodiment.

One embodiment of an inventive storage system within the scope of the present disclosures is represented schematically via storage system 450 depicted in FIGS. 4C and 4D. As shown, the inventive storage system 450 includes a host 402, source 410 and target 420. As shown, the inventive storage system 450 is in the process of performing an offload 408 to long term storage media 430.

Of course, the presently disclosed inventive embodiments may be implemented to advantage in scenarios other than during an offload 408, as would be understood by skilled artisans upon reading the present descriptions. Indeed, the presently disclosed inventive embodiments may be employed to particular advantage in any situation where data tracks on a target 420 need not be maintained in close consistency with changes to corresponding data tracks on a source 410. For example, the presently described inventive concepts may be useful in situations where one or more data tracks of the target 420 are designated "read-only," in some embodiments.

As will be further understood by a person having ordinary skill in the art upon reading the present descriptions, in embodiments where long term storage media 430 include tape media or other sequential access media, the offload process 408 may include sequentially writing data from a plurality of data tracks of the source 420 to the long term storage media 430. As such, and as shown in FIG. 4D, the offload process 408 may involve reading data tracks of the target 420 in a sequential manner, indicated by the dashed lines and offload progress indicators $O_i$ (offload initiation), $O_c$ (offload current); and $O_f$ (offload final).

Regardless of whether the offload process 408 utilizes sequential, random, or other access techniques, a storage manager (e.g. storage system manager 312 as shown in FIG. 3) is made aware of the offload process 408, including which data track(s) 428 of the target 420 have been offloaded to the long term storage media 430 and which data tracks 429 remain to be offloaded, but have not yet been completed. In preferred implementations, this allows the storage manager to reduce or eliminate I/O bandwidth associated with performing copy-on-write operations 406 in response to receiving a write command, request, instruction, etc. 404 which relates to a data track 416 of the source 410, and the corresponding data track 426 of the target 420 has already been offloaded to the long term storage media 430.

In particularly preferred embodiments, the implementation is accomplished via a target bit map (TBM) 415, as shown particularly in FIGS. 4C and 4D. In brief, upon completing an offload operation 408 for a data track 426, 428 of the target 420, the bit value associated with the offloaded data track 426, 428 may be modified to indicate data have already been updated, obviating the need for the subsequent copy-on-write operation 406 (as indicated in FIG. 4D).

For instance, according to one exemplary embodiment the TBM is managed by the storage system manager (e.g. storage system manager 312 as shown in FIG. 3), preferably a disk storage system manager. Using techniques known in the art, the storage system manager may detect a read operation performed on one or more data track(s) of a target 420.

In response to detecting the read operation, the storage system manager may modify a bit associated with the one or more data track(s) represented in the TBM 415, the modification may indicate that the data in those one or more data track(s) are up-to-date. From the perspective of the copy-on-write process 406, this effectively indicates the impending copy-on-write operation 406 has already been completed, obviating the impending copy-on-write operation 406 for at least the duration of the offload process 408. Accordingly, a commensurate amount of I/O reduction and resource consumption is achieved, improving the function of the storage system itself.

As particularly shown in FIG. 4C, in one approach the TBM 415 includes a plurality of binary bits having a value of 0 or 1. The bits may initially be set to "1" to indicate data should be copied from the source to the target. The storage manager controlling the storage system 450 detects a read access to the target 420 by, e.g., a process or a storage manager of or coupled to the storage media 430.

Detecting this read access is an indication that the corresponding tracks have been offloaded to the storage media 430 and the storage manager controlling the storage system accordingly modifies the corresponding bit in the TBM 415 to have a value of "0." Subsequently, as shown in FIG. 4D, when a copy-on-write process 406a would otherwise have caused the previously-read track on the target 420 to be updated, based on detecting the corresponding bit in the TBM 415 has a value of "0", the copy-on-write process 406a is not performed, and associated I/O bandwidth consumption is avoided.

On the other hand, if no read access has been detected by the storage system manager, then a copy-on-write process 406b may advantageously be performed, copying data from a source track 416 to a corresponding target track 426 and ensuring data are consistent before they are read during the offload process 408. Accordingly, tracks offloaded in a duration between $O_i$ and $O_c$ may be inconsistent with the corresponding tracks on the source after completion of the upload process, to the extent copy-on-write operations 406a would otherwise have been performed. However, this result is tolerable in the contexts presented herein, as well as equivalents that would be understood by a skilled artisan upon reading the present descriptions.

Tracks may also be evaluated on the storage media 430 after the offload process 408 is complete to determine which of the offloaded data are consistent with the post-offload state of the corresponding tracks on the source 410, in various approaches.

Those having ordinary skill in the art will also appreciate that the presently disclosed inventive embodiments are also useful in the context of a copy-on-write process optimized by caching. In such approaches, a copy-on-write operation 406 may be delayed pending completion of an offload process 408. Again, noting the presently disclosed concepts are not limited to the context of an offload process 408, while in conventional storage systems utilizing caching the subsequent copy-on-write process 406 would occur after offload 408 and consume commensurate resources and I/O bandwidth, storage systems implementing the presently disclosed configuration and techniques would ignore the copy-on-write process 406 and avoid the consumption associated with the post-offload copy-on-write process 406.

In more approaches, it may be advantageous to utilize the TBM in a similar manner, but instead of (or in addition to) preventing copy-on-write processes, cache hints can be given to the storage system manager, enabling the storage system manager to delay offloading data that is about to be read by the tape system. Holding off on these offload processes can prevent the usage of internal bandwidth in order to achieve the copy-on-write action that would otherwise have been performed at that time.

In the storage systems disclosed herein, according to some embodiments it may be advantageous to keep as much data as possible in a cache. However, accessing data in cache may require accessing storage media, which is associated with greater I/O consumption than accessing data in memory. Accordingly, by leveraging a priori knowledge that data tracks of a particular target are subject to a future offload, will be designated read-only, or otherwise may tolerate inconsistency to some extent, it is possible to reduce I/O associated with retrieving data from disk in the course of the offload process when using caching.

In such embodiments, it may be particularly advantageous to utilize the TBM to determine which data stored in cache have been offloaded, and which data have yet to be offloaded, in order to selectively delay offloading those data stored in cache and which have yet to be offloaded. In more embodiments, data stored in memory which have yet to be offloaded may or may not be delayed in a similar manner, as would be understood by a person having ordinary skill in the art upon reading the present descriptions.

In a similar manner, it is possible to utilize multiple bitmaps to provide finer granularity of awareness with respect to the status of particular data tracks on a source, target, etc. regarding data validity. In particular, it may be advantageous to track whether (1) data have been read from the target (e.g. in the course of an offload process); and (2) data have been written to the target (e.g. in the course of a copy-on-write process which may be applicable to a data track not yet read during an offload process).

Accordingly, in one embodiment a first bitmap may be utilized to keep track of whether particular data tracks on the source have been read by the storage medium to which data are (or will be) offloaded. Based on the first bitmap, copy-on-write processes intended to be applied to tracks on the target which have already been offloaded may be prevented as described above. Similarly, a second bitmap may be utilized to keep track of those tracks which have already been written to on the target, e.g. tracks downstream of the current position of an offload process on the target volume. Utilizing these bitmaps in combination, it is possible to determine which data on the target volume (post-offload) and which data on the storage medium are consistent with the state of the corresponding data on the source at the time the offload process is completed. The first and/or second bitmaps are preferably target bit maps, in various approaches.

For instance, those tracks that were read during the offload process but for which no subsequent write operation/request/command was received at the source accurately reflect the status of the data post-offload and may be considered consistent. This consistency determination may be accomplished by comparing the bit values for the various tracks in the first and second bitmaps, in various approaches.

One consequence of implementing the presently disclosed inventive concepts is that a future write that would have caused a copy-on-write under conventional techniques and systems, is instead ignored if the data was offloaded to, and/or read by, long term storage media. As a result, the data is no longer consistent with the updated data on the source. In the case of tape off-load, this consequence may be acceptable, and in fact desired in situations where the inconsistent data will not be relied upon going forward, e.g. will not be read again. Accordingly, in preferred embodiments this solution should be an option for the user to select. For instance, in one approach the presently disclosed "read-once" functionality should be user-enabled/disabled via a toggle setting available, e.g. in a configuration interface such as a command line interface, graphical user interface, etc.

Another consequence of implementing the presently disclosed inventive embodiments is that they disallow reverse restore capabilities, i.e. forcing the data from the target back into the source, with respect to at least those data tracks for which a copy-on-write process was ignored.

Figure 5:
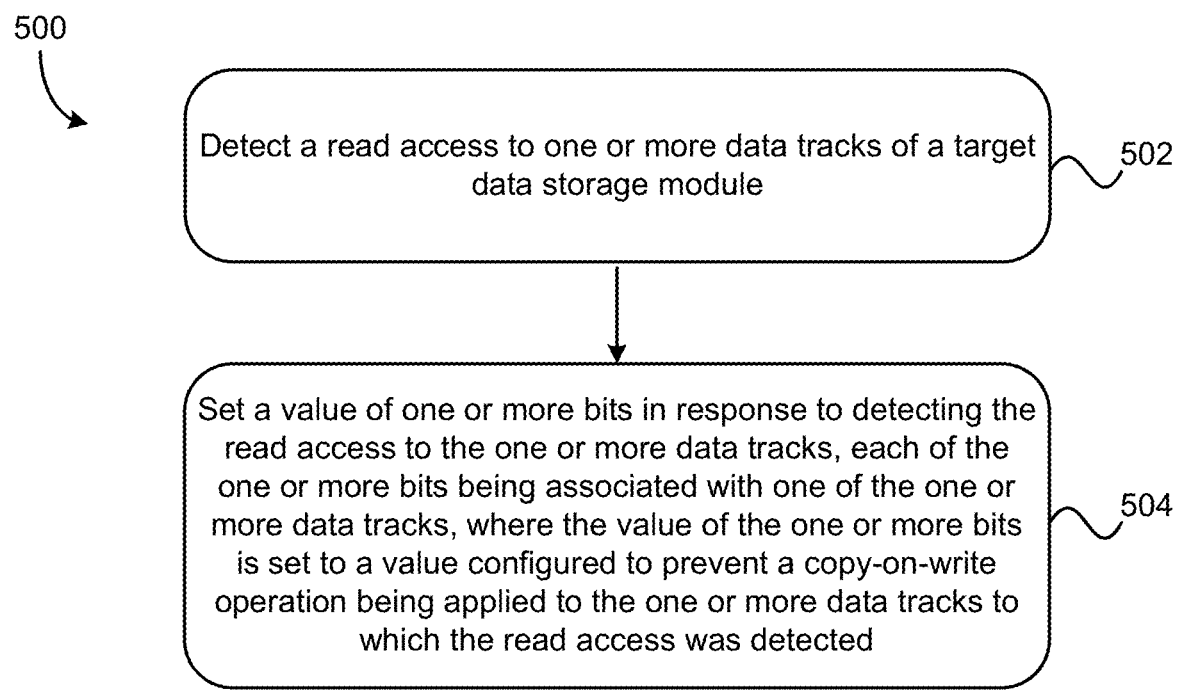
FIG. 5 is a flowchart of a method, according to one embodiment.

Now referring to FIG. 5, a flowchart of a method 500 is shown according to one embodiment. The method 500 may be performed in accordance with the present invention in any of the environments depicted in FIGS. 1-3, 4C and 4D, among others, but not the environments depicted in FIGS. 4A and 4B, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a storage system manager, e.g. storage system manager 312 as shown in FIG. 3, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where access, or an attempt to access, one or more data tracks of a target data storage module are detected. The access or access attempt is preferably a read access rather than a write access, and is preferably detected by a storage system manager managing the storage system of which the target data storage module is a part. More preferably, the read access and/or access attempt are received at the target data storage module and sent from a long-term storage module, preferentially a tape storage device.

In response to detecting the access or access attempt, in operation 504 method 500 includes setting a value of one or more bits, where each of the one or more bits is associated with one of the one or more data tracks on the target data storage module. Preferably, the value of the one or more bits is set to a value configured to prevent a copy-on-write operation being applied to the one or more data tracks to which the access or attempt for access was detected.

Of course, the method 500 may additionally and/or alternatively include any other functionality as described herein without departing from the scope of the present disclosure.

Preferred embodiments may include any one or more of the following additional and/or alternative features.

As described above, the one or more bits are preferably stored in a TBM, and preferably are associated with data tracks in a one-to-one relationship such that the TBM represents the data tracks of the target storage module.

Setting the value of bits for which access was obtained or attempted to the value configured to prevent copy-on-write operations being applied to the associated data tracks may include determining a value of each of the one or more bits in response to detecting the read access to the one or more data tracks; determining whether the value of each of the one or more bits is the value configured to prevent the copy-on-write operation being applied to the one or more data tracks to which the read access was detected; and in response to determining the value of one or more of the one or more bits is not the value configured to prevent the copy-on-write operation being applied to the one or more data tracks to which the read access was detected, performing the setting operation.

In more approaches, detecting the access may include determining whether the read access is requested by a long term data storage module coupled to the target data storage module. As will be appreciated based on reading the above descriptions, in some approaches it is advantageous to permit copy-on-write operations where the access or attempt is not from a long-term storage module, as this may indicate that the data on the target storage module will be needed in the future and consistency should be maintained. Accordingly, in some approaches it is particularly advantageous to either determine the identity of the module/device requesting access to the target storage module, and/or permit a user to manually define whether or not to prevent copy-on-write operations as described herein, e.g. by setting a flag.

In various approaches, the presently disclosed inventive techniques may include detecting a pending copy-on-write request applicable to one or more of the one or more data tracks of the target data storage module. The detection of pending copy-on-write requests is optional, but may be advantageous to selectively prevent copy-on-write operations based on other criteria than merely detecting an access or access attempt. In other embodiments, additional computational efficiency and I/O reduction may be possible by omitting any attempt to detect incoming or pending copy-on-write requests, and instead relying simply on the access or access attempt to trigger copy-on-write prevention functionality. Skilled artisans will appreciate the advantageous applicability of each embodiment in various real-world contexts, upon reading the present descriptions.

For instance, in one approach preventing copy-on-write may include determining the pending copy-on-write request is applicable to one or more of the data tracks to which the read access was detected, the determining being based on evaluating the value of the one or more bits associated with the one or more data tracks to which the write request is applicable; and preventing the pending copy-on-write request based on the result of the evaluation. In particular, if the evaluation reveals the value of the bit associated with the target storage system data track is the value configured to prevent copy-on-write (e.g. a value of 0), then the copy-on-write is preferably prevented. If the evaluation instead reveals the value of the bit associated with the target storage system data track is not the value configured to prevent copy-on-write (e.g. a value of 1), then the copy-on-write is preferably permitted.

As alluded to above, consistency determination may also be a useful aspect of various embodiments of the presently disclosed inventive techniques. For instance, in one approach consistency determination may include determining a consistency of the one or more data tracks of the target storage module relative to one or more corresponding data tracks of a source storage module. The determining is based, at least in part, on evaluating bits in two bit maps, preferably TBMs. Each of the bits in one of the bit maps is associated with a data track on the target storage module, while each of the bits on a second of the bit maps is associated with one a corresponding data track of the source storage module. Each of the bits in the first bit map indicates whether access was made or attempted to the associated data track of the target storage module; while each of the bits in the second bit map indicates whether a write operation was applied to the corresponding data track of the source storage module with which the bit is associated.

Alternatively, the bits of each bit map may be associated with data tracks of the target storage module, and bits of one bit map may track the access status of the corresponding data tracks, while bits of the other bit map may track incoming copy-on-write requests received from the source storage module by the target storage module.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for read-once point-in-time copy, the computer program product comprising a computer readable storage medium having program instructions embodied therewith, the program instructions executable by a storage system manager to cause the storage system manager to perform a method comprising:
   detecting a read access to one or more data tracks of a target data storage module;
   setting a value of one or more bits in response to detecting the read access to the one or more data tracks, each of the one or more bits being associated with one of the one or more data tracks;
   wherein the value of the one or more bits is set to a value configured to prevent a copy-on-write operation being applied to the one or more data tracks to which the read access was detected; and
   wherein detecting the read access to the one or more data tracks of the target data storage module indicates the one or more data tracks have been written to the target data storage module.

2. The computer program product as recited in claim 1, wherein the one or more bits are stored in a target bit map (TBM); and
   wherein the TBM represents the one or more data tracks of the target data storage module.

3. The computer program product as recited in claim 1, comprising program instructions executable by the storage system manager to cause the storage system manager to:
   determine the value of each of the one or more bits in response to detecting the read access to the one or more data tracks;
   determine whether the value of each of the one or more bits is the value configured to prevent the copy-on-write operation being applied to the one or more data tracks to which the read access was detected; and
   in response to determining the value of one or more of the one or more bits is not the value configured to prevent the copy-on-write operation being applied to the one or more data tracks to which the read access was detected, performing the setting.

4. The computer program product as recited in claim 1, comprising program instructions executable by the storage system manager to cause the storage system manager to determine whether the read access is requested by a long term data storage module coupled to the target data storage module.

5. The computer program product as recited in claim 1, comprising program instructions executable by the storage system manager to cause the storage system manager to detect a pending copy-on-write request applicable to one or more of the one or more data tracks of the target data storage module.

6. The computer program product as recited claim 5, comprising program instructions executable by the storage system manager to cause the storage system manager to:
   determine the pending copy-on-write request is applicable to one or more of the data tracks to which the read access was detected, the determination being based on evaluating the value of the one or more bits associated with the one or more data tracks to which the pending copy-on-write request is applicable; and
   prevent the pending copy-on-write request based on the evaluation.

7. The computer program product as recited in claim 5, comprising program instructions executable by the storage system manager to cause the storage system manager to:
   determine the pending copy-on-write request is not applicable to one or more of the data tracks to which the read access was detected, the determination being based on evaluating the value of the one or more bits associated with the one or more data tracks to which the pending copy-on-write request is applicable; and
   allow the pending copy-on-write request based on the evaluation.

8. The computer program product as recited in claim 1, comprising program instructions executable by the storage system manager to cause the storage system manager to: determine a consistency of the one or more data tracks of the target data storage module relative to one or more corresponding data tracks of a source data storage module.

9. The computer program product as recited in claim 8, wherein the consistency determination is based on evaluating the one or more bits and a second set of one or more bits;

wherein each of the one or more bits in the second set are associated with one of the corresponding data tracks of the source data storage module; and wherein each of the one or more bits in the second set indicates whether a write operation was applied to the corresponding data track with which the bit is associated.

10. The computer program product as recited in claim 9, wherein the one or more bits are stored in a target bit map (TBM); and wherein the one or more bits in the second set are stored in a second TBM.

11. The computer program product as recited in claim 1, wherein the value of the one or more bits to which the read access was detected is set to zero.

12. A computer program product for read-once point-in-time copy, the computer program product comprising a computer readable storage medium having program instructions embodied therewith, wherein the computer readable storage medium is not a transitory signal per se, the program instructions executable by a storage system manager to cause the storage system manager to perform a method comprising:

detecting a read access to one or more data tracks of a target data storage module;

setting a value of one or more bits in response to detecting the read access to the one or more data tracks, each of the one or more bits being associated with one of the one or more data tracks; and delaying a second copy-on-write operation applicable to the target data storage module until an offload process is complete; and wherein the value of the one or more bits is set to a value configured to prevent a copy-on-write operation being applied to the one or more data tracks to which the read access was detected.

13. The computer program product as recited in claim 1, comprising program instructions executable by the storage system manager to cause the storage system manager to determine an identity of a module requesting access to the target data storage module and/or a device requesting access to the target data storage module.

14. The computer program product as recited in claim 1, comprising program instructions executable by the storage system manager to cause the storage system manager to permit a user to manually define whether or not to prevent copy-on-write operations with respect to the target data storage module.

15. The computer program product as recited in claim 1, wherein the one or data tracks of the target data storage module are designated "read-only."

16. The computer program product as recited in claim 12, wherein the offload process comprises offloading one or more data tracks of the target data storage module to a long term data storage module.

17. The computer program product as recited in claim 16, wherein the long term data storage module comprises either or both of: a tape-based storage system; and a sequential access storage medium.

18. The computer program product as recited in claim 16, comprising program instructions executable by the storage system manager to cause the storage system manager to ensure the one or more data tracks to be offloaded from the target data storage module to the long term data storage module are consistent.

19. The computer program product as recited in claim 18, wherein ensuring the one or more data tracks to be offloaded from the target data storage module to the long term data storage module are consistent is performed prior to reading the one or more data tracks to be offloaded from the target data storage module to the long term data storage module during the offload process.

20. The computer program product as recited in claim 16, comprising program instructions executable by the storage system manager to cause the storage system manager to:

cache the one or more data tracks of the target data storage module to be offloaded to the long term data storage module in response to determining the one or more data tracks of the target data storage module to be offloaded to the long term data storage module:

are subject to a future offload process;

will be designated read-only; and/or may tolerate inconsistency between the target data storage module and the long term data storage module.

* * * * *